United States Patent [19]

Kucharczyk

[11] Patent Number: 5,070,934

[45] Date of Patent: Dec. 10, 1991

[54] VENTILATION DEVICE WITH HEAT RECOVERY

[75] Inventor: Ekhard Kucharczyk, Wilnsdorf, Fed. Rep. of Germany

[73] Assignee: Siegenia-Frank KG, Siegen, Fed. Rep. of Germany

[21] Appl. No.: 358,889

[22] Filed: May 30, 1989

[30] Foreign Application Priority Data

May 30, 1988 [DE] Fed. Rep. of Germany ....... 3818289
Aug. 18, 1988 [DE] Fed. Rep. of Germany ....... 3828011

[51] Int. Cl.[5] ...................... H01H 47/82; F24D 19/10; F24F 11/02
[52] U.S. Cl. .................... 165/54; 165/909; 165/122
[58] Field of Search ................. 165/54, 909, 122; 98/33.1

[56] References Cited

U.S. PATENT DOCUMENTS 4,557,321 12/1985 Von Resch ........................ 165/909

FOREIGN PATENT DOCUMENTS 3017431 2/1982 Fed. Rep. of Germany .
3006318 8/1986 Fed. Rep. of Germany .
3111360 1/1987 Fed. Rep. of Germany .
58-190640 11/1983 Japan .
657693 9/1986 Switzerland .

OTHER PUBLICATIONS

Hosono, Patent Abstracts of Japan M-276, vol. 8, No. 35, Feb. 15, 1984, Abstract for JP58-190640(A), 11/7/83.

Primary Examiner—John Ford
Attorney, Agent, or Firm—Blodgett & Blodgett

[57] ABSTRACT

Ventilation device for the simultaneous ventilating and exhausting an enclosed room having the capacity for the recovery of heat from the exhaust media current. The exhaust media current is given a longer flow path than the ventilation media current; particularly the flow path of the exhaust media current at the exit side of the heat exchanger has a flow deflection which includes an arc measure of more than 90° degrees and preferably of about 150°. Further, the flow paths of both the exhaust and the ventilation media current extend from their inlets to at least the heat exchanger in an ascending direction.

30 Claims, 7 Drawing Sheets

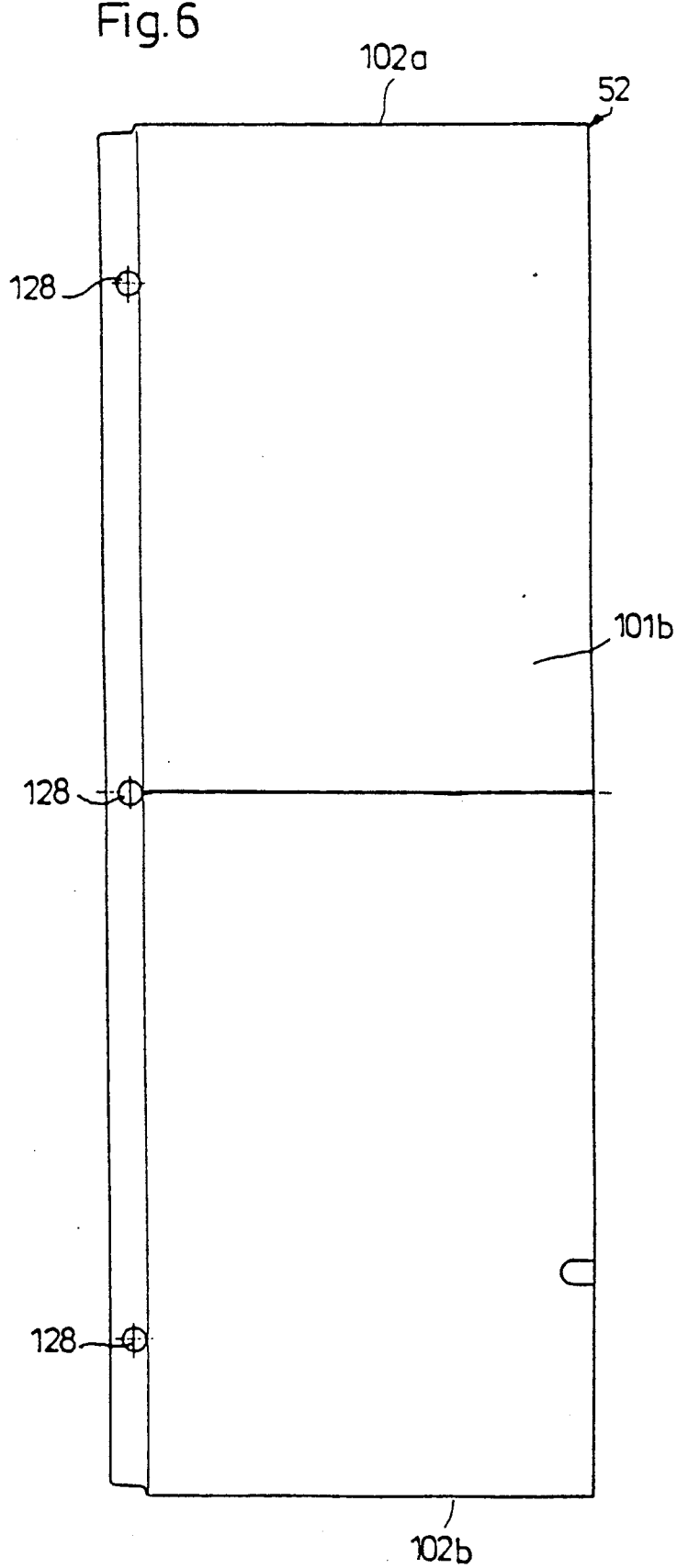

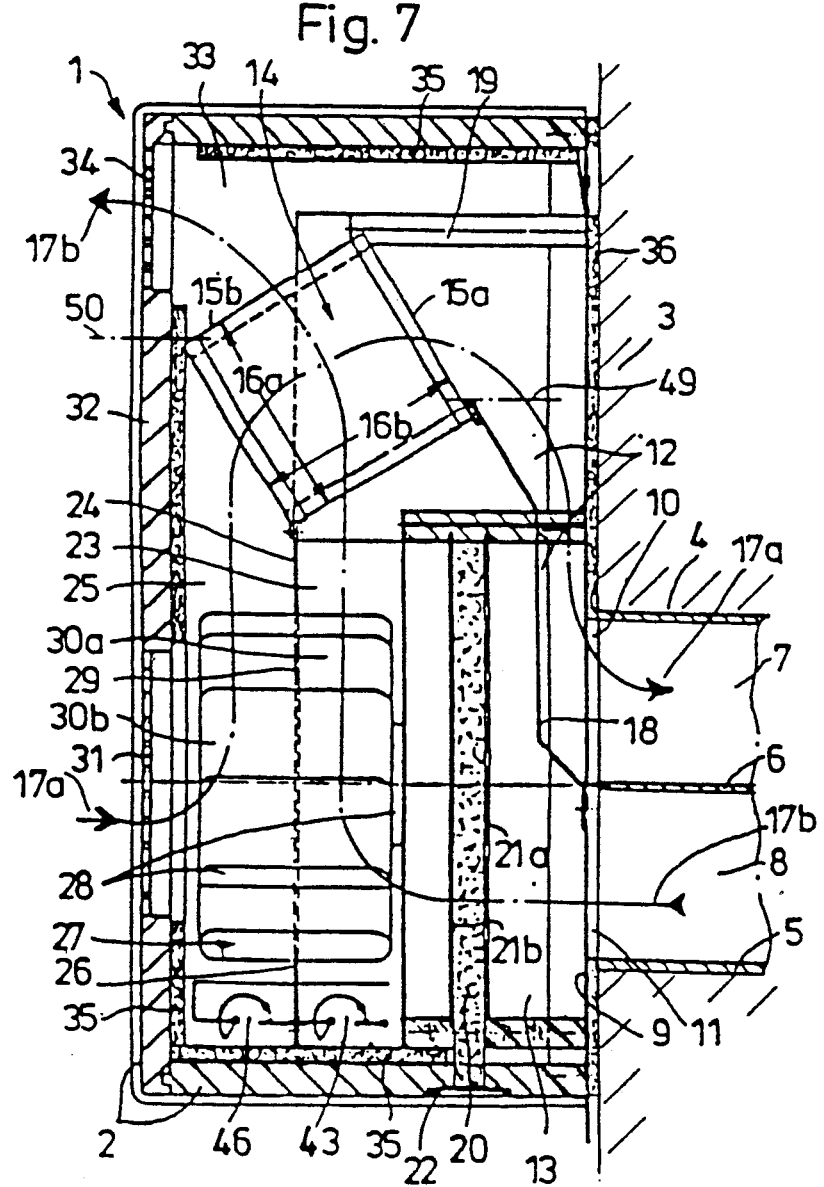

5,070,934

VENTILATION DEVICE WITH HEAT RECOVERY

FIELD OF THE INVENTION

The invention concerns devices for exhausting stale air from enclosed spaces such as rooms and introducing ventilating fresh air.

BACKGROUND OF THE INVENTION

This invention concerns ventilations devices for the simultaneous ventilation and exhausting of rooms, particularly with the recovery of heat from the air flow. Such a ventilating device may have a box-shaped housing to be mounted on a room wall. Such a device is connected through channels leading to outside air for the ventilation and exhaust media flows, respectively. Within the housing two flow routes or currents are developed separate from one another. They each are provided with an inlet and an outlet, the inlets being arranged on opposite walls of the device. In order to carry out active movement of the ventilating media both flow routes are provided with a radial blower and a blower wheel inside the housing, preferably as a single blower wheel divided by a radial separating wall into two independent ventilation media moving means. These means project into each of the flow routes somewhere near its respective inlet opening. The exhaust inlet opening in the device is formed on the front wall facing the room while the outlet for the ventilating air from the device is likewise usually placed in the same front wall facing the room.

Ventilation devices of this structure which operate in this manner are disclosed in German Patent 3,017,431 and German Patent 3,111,360. These devices, especially the latter device, have proved themselves to be quite useful in practical applications.

In these known ventilation devices high-efficiency of heat recovery depends on a number of factors. Initially, the radial blower is constructed of a blower wheel consisting of two halves, each in a respective portion of a joint chamber which is used by both exhaust and ventilation flow routes. This chamber for both flow routes is defined within the housing by an insertion body which spirally embraces the perimeter of the blower wheel and is spaced from it. At a longitudinal distance from this chamber the two flow routes merge into a heat exchanger element which is formed in a cross-current construction into an odd number of longitudinal sections following one another in a convoluted pattern in the flow through direction. Between each two right-angled, successive exchange areas formed by stacks of lamellae or plates there is a lamellae-free or plate-free area. The lamellae or plate stack adjacent to the blower wheel is configured with a vertical edge which effects the initial separation of the two flow routes and is in the same plane as the separating wall of the blower wheel. The end body which separates the two end chambers from one another consists of a level separating wall which lies in the same plane as the vertical edge of the lamellae or plate stack; this effects the final separation of the two flow routes of the lamellae or plate stack at a distance from the radial blower. The walls of all of the functional parts described above which come into contact either with the exhaust media flow or with the ventilations media flow are constructed of highly heat-conducting, laminated material.

The primary disadvantage of this prior ventilation device lies in the fact that the two flows of media, the ventilation media flow and the exhaust media flow, have to be conducted over a relatively long distance past the contact surfaces of the heat exchanger in order to obtain the desired rate of heat recovery in an efficient manner.

This results in a relatively large total length of the boxed-shaped housing which contains the prior ventilation device because the inlet opening and the outlet opening for each of the ventilation flow routes and the exhaust media flow have a correspondingly large spacing from one another.

The primary object of the invention is to achieve an efficiency of heat recovery at least equal to or greater than a ventilation device as shown in German Patent 3,111,360 but with a substantially reduced total length and with no corresponding increase in depth.

SUMMARY OF THE INVENTION

The primary object of the invention is achieved by a construction which produces an exhaust media flow path which is larger than the flow media flow path of the ventilation media. This is partly accomplished by the provision of a flow deflection on the exit side of the heat exchanger which includes flow path turn having an arc measure, A, of at least 90°. It is especially favorable that this deflection arc be between 120° and 180° and most preferably about 150°. Such a device can accomplish a heat recovery number, E, between 0.7 and 0.8 which corresponds to an efficiency of 70% to 80%.

Another aspect of the invention is that the cross-sectional area of the flow route in the exhaust media flow path downstream of the heat exchanger and the above mentioned flow deflection area is smaller in cross sectional area than the corresponding cross-sectional area of the heat exchanger itself and of the section of the flow route upstream of the inlet into the heat exchanger.

Another aspect of the invention is that the two flow routes or paths are conducted from their inlet openings upwards through the heat exchanger and through the housing of the ventilation device, whereby the heat exchanger in both flow routes is configured above the radial blower. In fact for the exhaust air current flow route the exchanger forms the geometrically highest point.

A further aspect of the invention is that the cross-sectional area of the inlet opening for the exhaust media flow route is larger than the cross-sectional area of the outlet opening. It is also preferable that the flow route for the ventilation media from the exit side of the heat exchanger towards the air supply ducts or openings has a deflection arc whose measure, B, is less than 90° preferably between 0° and 60°. In the simplest construction, the planes of the inlet openings of the housing may lie parallel to the plane of the inlet side of the blower wheel halves. It is been shown to be particularly favorable, however, when the planes of the inlet sides of the blower wheel halves are inclined at an acute angle to the plane of the inlet openings of the housing. In this way the longitudinal portions of the flow routes which pass by the blower wheel halves and the structure which encircles them is parallel to the plane of rotation of the blower wheel halves.

In a further aspect of the invention, the inlet side of the blower wheel half associated with the exhaust media flow is essentially coextensive with the associated inlet opening of the housing while the inlet side of the blower wheel half which is assigned to the ventilation media current is partly registered with associated inlet opening of the housing. In a preferred embodiment of the invention the inlet opening for the ventilation media current and the outlet for exhaust media current can lie directly adjacent each other in the rear wall of the housing and be separated simply by a crossbar. In this manner each of these openings forms, in relation to the crossbar, a semi-circular opening which is connected to a correspondingly divided channel, tube wall lining, or the like. As a result of these structural features, the heat recovery possible by means of this ventilating device can be accomplished with ventilator dimensions as small as 230 mm × 180 mm × 130 mm and can achieve an air exchange of between 30 and 40 cubic meters per hour. To avoid a reduction of heat recovery efficiency it may be desirable to arrange a filter at least between the inlet opening of the ventilation media flow and the inlet side of the associated blower half. For the same purpose a filter should be provided between the inlet opening for the exhaust media and the inlet side of the associated blower wheel half. Both of the above mentioned filters can be formed from a single filter mat which can be laid between the structure containing the blower wheel and the surrounding three housing walls and extending into each of the two flow routes. This allows a simple handling of the filter when a change becomes necessary at certain intervals. In this regard it is preferable that the take up space for the filter mat run from the front wall along a bottom transverse wall to the rear wall of the housing and be provided there with guide elements or ribs of curved shape running from at least the bottom transverse wall towards the rear wall. The position of the filter can be fixed in addition by means of clamping surfaces which are formed, for instance, between the front wall of the housing and the adjacent defining walls of the structure which encloses the flow routes.

The invention may also be embodied in quite different structures. For example, it is possible to embody the invention in a device having a rear wall which carries all of the structure defining the flow routes, the radial blower and heat exchanger and having a covering hood formed out of four transverse walls and a front wall which can be detachably connected with it.

In another structure, however, having special advantages the rear wall and the four transverse walls of the housing can be formed of one piece, for example, by plastic injection molding and can be adapted to be closed with a detachable front wall to which is associated the structure forming the flow routes, the radial blower, and the heat exchanger. The device of the invention is preferably provided with a heat exchanger which uses a cross current design and is formed a single plate- or lamellae-stack for example of thin laminated material such as light metal or copper sheeting. It has been found that plates or lamellae with an edge length of about 70 mm (that is, a diagonal measure of about 100 mm) achieve high effectiveness with small structural dimensions. The plate- or lamellae-stack is clamped or locked at two diagonally opposite corners while the two other corners, which are also diagonally opposite one another, abut at supporting or aligning stops of the structure which defines the flow routes or at the housing of the device itself. Thus, a particularly simple assembly of the device is achieved. The structure which defines and localizes the two flow routes may be provided at the end opposite from the heat exchanger with a hollow chamber or may be connected with such a chamber, in which can be housed electric or electronic switching and control links. An electric main switch can be housed in this hollow chamber, which switch directly or indirectly abuts with a portion of the front wall which is elastically deformable so that the switch can be operated in this manner from outside the device. Both for ventilating devices of the above type (which are designed for heat recovery from the exhaust media current) and for ventilating devices which merely provide for a simultaneous ventilating and exhausting of rooms, a plurality of ribs are provided on the front wall which are slanted from edge to edge of the wall and, for favorable air circulation, are perforated in the range of the openings for air removal and delivery. In this manner, both the ventilation media current and the exhaust media current flow at an angle to the rectangular outer contour of the housing of the ventilation device. Given the customary mounting position of such a ventilation device the flow is directed at an obtuse angle against the room defining surfaces so that there arises a draft free air distribution effect. The ribs are preferably formed with cross-sections having a portion which is parallel to the front wall, a section which is essentially normal to plane of the front wall, and a section which is inclined at an angle against this main plane. The perforations of the ribbing are located only in the portion of the ribbing which runs essentially normal to the main plane of the front wall. In this way the ventilation air current exits from the supply air opening of the housing at an acute angle to the main plain while the exhaust media current is likewise pulled in at an angle to the main plane of the housing into the exhaust air opening. This also assists in creating favorable current situations in the room area because the air direction runs at an obtuse angle to the above mentioned room boundary surfaces. To avoid the ventilation media currents and the exhaust media currents adversely affecting each other the respective angles of inclination of the portions of the ribbing which are angled to the main wall of the device are mirror inverted images with respect to each other. Thus a separation is obtained between the different media currents and undesirable mixing of them is inhibited in a simple manner. This is accomplished especially well when the angled portions of the ribs in the region of the exhaust opening have a downward slanting direction while in the region of the supply air opening they are angled upwards and forwards. In order to stabilize the ribs in the region of the exhaust air opening and the air supply opening stiffening webs are provided which extend transversely, to the course of the direction of the ribbing and connect the ribs with one another in the region of their perforations.

In a ventilation device in which the radial blower is automatically switchable on and off by means of a relay control device activated by a thermometer spring or a hygrometer spring, it has been found beneficial according to the invention that the thermometer or hygrometer spring carries a permanent magnet to which a reed contact is associated as a switching contact. The functional parts of such a reed contact are totally shielded against atmospheric factors and should not be subject to any corrosion or the development of adhesive dirt layers. In this way a permanently automatic operational control of the ventilation device is assured.

A further aspect of the invention involves a configuration which provides that the axis of the radial blower is slanted compared with the horizontal configuration of the rest of the structure and housing. In this manner a vibration free and therefore quietly running radial blower can be achieved without the necessity of using expensive roller bearings. Moreover, if a radial blower is used whose blower wheel is composed of a poorly heat conducting material such as plastics it is preferable to provide the separation wall between the two halves of the blower wheel unit with perforations in the region between the bearing hub and the rim, which perforations should be covered at least for the most part with a thin layer of material which conducts heat well, such as metal foil. In this way the functional region near the blower wheel makes a contribution to the desirable heat transfer between the exhaust media current and the ventilation media current. Such a foil covering may be so constructed to provide a variable-sized bypass between the exhaust media flow and the ventilation media flow in this area, which would permit an exchange of air humidity and thus favor the heat exchange effect.

A chamber may be provided in the housing of the ventilation device above the heat exchange element, if necessary, in which a main electric supply cable can be located for the device and which can be used for the accommodation of a main supply cable of extra length. In this way only so much of the cable as is required for a specific application needs to be pulled out.

BRIEF DESCRIPTION OF THE DRAWINGS

The invention is best understood, however, by reference to some of its possible structural forms as shown in the attached drawings, in which:

FIG. 6 is a side view of the ventilation device, as seen in the direction of arrow VI in FIG. 2, and FIG. 7 is a view of another embodiment of a ventilation device which acts as a heat recovery system and whose air supply flow path and exhaust air flow path are driven by a radial double blower.

DESCRIPTION OF THE PREFERRED EMBODIMENT

Figure 1:
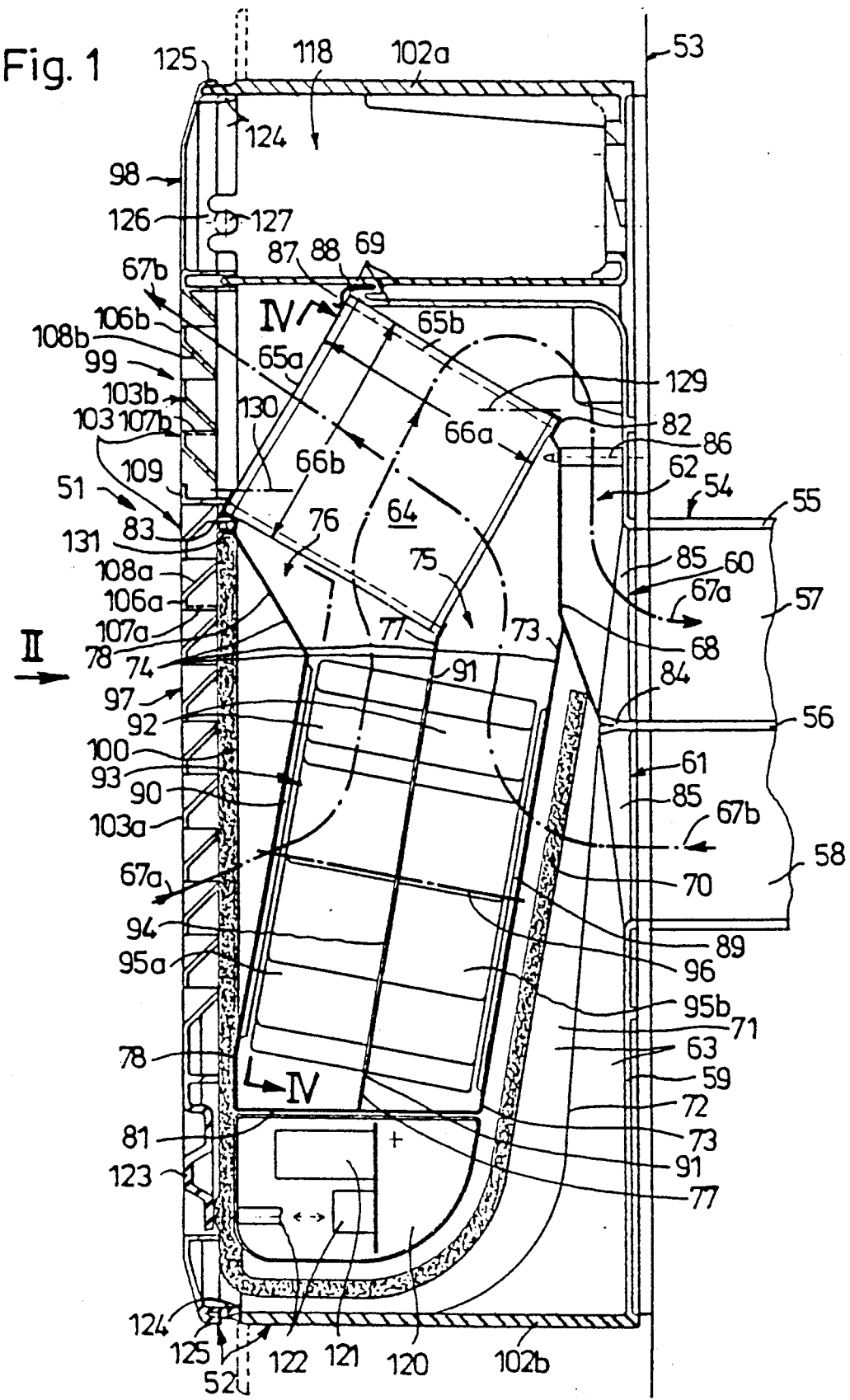
FIG. 1 is a longitudinal cross section along the line I—I of FIG. 3 showing a preferred construction of a ventilation device which is provided with heat recovery element.
Figure 4:
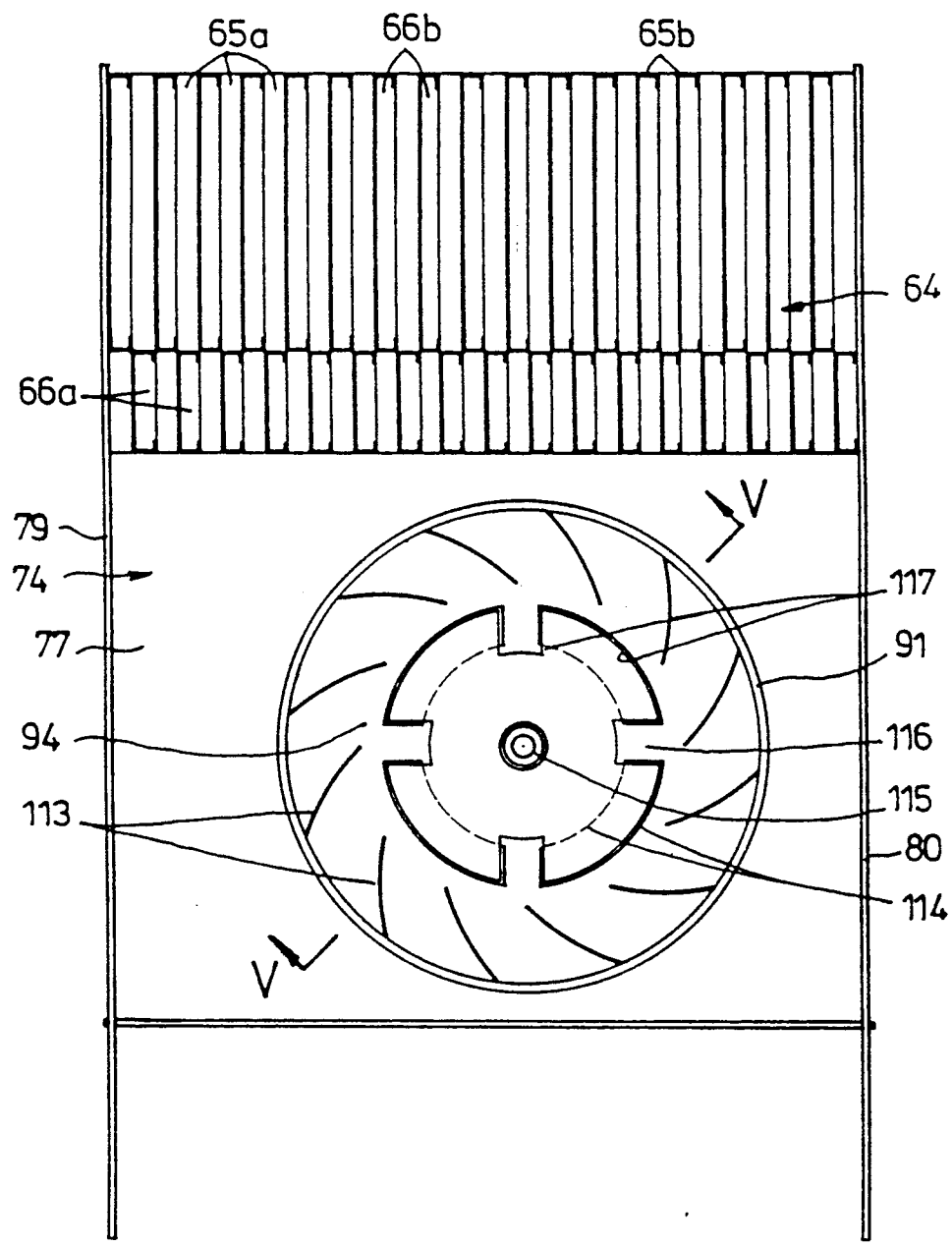
FIG. 4 is a view of the blower and heat exchanger viewed in the direction of arrow IV—IV.

FIG. 1 of the drawings shows a ventilation device 51 for the simultaneous ventilation and exhausting of rooms which may be housed for example in a box-shaped housing 52. The device 51 can be mounted preferably on the room side of a mounting wall 53 which is provided with a communication 54 to the outside and to which a tubular lining 55 can be inserted. The tubular lining 55 has a separating wall 56 which defines 2 extended flow channels 57 and 58 which have approximately identical cross section. The tubular lining is preferably of round cross section, the separating wall 56 defining two flow channels 57 and 58 of semi-circular cross-section. In the rear wall 59 of the housing 52, two openings 60 and 61 are provided whose cross-sectional shape corresponds to the cross sectional shape of the flow channels 57 and 58 so that these can be directly connected. The opening 60 communicates with a chamber 62 in the housing while the opening 61 communicates in a like manner with a chamber 63 in the housing. A heat exchanger 64 is provided inside the housing which operates as a heat recovery device preferably of a cross current construction. It consists of a stack of individual lamellae or plates which are in turn composed of a larger number of individual lamellae or plates 65a and 65b each of which has an approximately C shaped cross section and a squarish outline. Each individual lamella or plate 65a or 65b in the heat exchanger is preferably fabricated out of a relatively thin material having high heat conducting ability, for example, aluminum or copper foil. These are stacked directly upon one another to form the lamellae or plate stack as shown in FIG. 4. The individual lamellae 65a and 65b are laid upon one another alternately around an axis which is normal to the plane of the plates and are in each case turned by 90° against one another so that flowthrough channels 66a and 66b are formed. These channels are turned against one another at a 90° angle so that the media currents or flow paths 67a and 67b which are guided through them cross one another in the flow path channels 66a and 66b which are layered together. The chamber 62 associated with the channel 57 is separated from the chamber 63 associated with the channel 58 by means of a relatively thin sheet metal wall 68 which extends from a plane inside the housing 52, which corresponds in position with the separating wall 56 of the lining 55, by means of multiple bends up to the vertex edge of the heat exchanger 64. Over the top of the chamber 62 in the housing 52 a head wall is provided which is also connected to another, higher-lying vertex edge of the heat exchanger 64 and thereby establishes the connection of the chamber 62 with the through flow channels 66a of the heat exchanger 64. A plate-like filter insert 70 is disposed within the chamber 63 and lies in a free space 71 inside the housing 52 which is defined by inner support webs 72 which lie against the rear wall 59 of the housing 52 and defined on the other side by the wall 73 of an air conducting structure 74. This air conducting structure 74 is contained within the housing 52 of the device and surrounds two additional chambers 75 and 76 which are separated from each other by means of a middle wall 77. This middle wall 77 extends parallel to the rear wall 73 of the structure and also parallel to a third, front wall 78 of the structure 74. All of the walls 73, 77 and 78 of the air conducting structure 74 as well as the transverse walls 79 and 80 seen in FIG. 4 are formed from thin laminated bodies of material which is heat conducting, for example, sheet metal. This structure 74 defines a separate integral unit within the housing 52. At the bottom of the two chambers 75 and 76 of this structure 74 a wall 81 is provided which is either part of the structure 74 or is defined by a wall of another insertion defining a hollow space 120 which will be described below. At the top of this air conducting structure there is a connection to the heat exchanger 64 in such a manner that the chamber 75 is connected with the flowthrough channel 66b which are defined by the individual lamellae 65b while the chamber 76 is connected to the flowthrough channels 66a which are defined by the individual lamellae 65a. The heat exchanger 64 constructed of the stack of lamellae 65a and 65b is held together and the stack is aligned at two diametrically opposed corners by means of angled edges 82 and 83 and is firmly held in place within the housing by means of these edges as shown in FIG. 1. The angled edge 82 is formed integrally onto the upper end of the sheet metal wall 68 whose lower end is bent off and fixed in a slot of a web 64 which defines the two openings 60 and 61 in the rear wall 59 of the housing. The web is stabilized by means of a plurality of ribs 85 which are disposed as a grid across the cross-sectional openings 60 and 61. The angled edge 82 of the sheet metal wall 68 is held in the proper spacing from the back wall by means of pin-like separator supports 86. The angled edge 83 on the other hand is formed integrally on the upper end of the bent off wall 78 of the air conducting structure 74. The upper end of the middle wall 77 of the air conducting structure 74 abuts at the lower oriented corner of the heat exchanger 64 defined by the stack of lamellae 65a and 65b. The diagonally opposite upper corner is positioned and supported at the head wall 69 of the housing 52. A securing element 87 of angular cross section (for example in the form of a rail) can be pushed into a slot 88 in the housing wall 69 and can engage with a downwardly bent section against the free side of the upper corner of the heat exchanger 64 so that this is fixed in position at the wall 69.

Both the rear wall 73 of the air conducting structure 74 and the front wall 78 are provided with circular apertures 89 and 90 which correspond with one another. The middle or separating wall 77 which defines the two chambers 75 and 76 in the body 74 is also provided with a circular aperture 91. However, the latter aperture is constructed with a diameter which is larger than the apertures 89 and 90. These apertures 89, 90 and 91 are arranged in alignment with one another and an electrically driven radial blower 93 is provided whose blower wheel is supported in the air conducting structure and is coaxial with the apertures. The blower wheel is supplied with a radial separating wall 94 which divides it into two blower wheel halves 95a and 95b. The blower 93 and its blower wheel 92 are positioned in the air conducting structure 74 so that the radial separation wall 94 lies at least approximately in the same plane as the middle wall 77 which divides the two chambers 75 and 76. In this way the inlet side of the blower wheel half 95a is positioned parallel to the aperture 90 and the wall 78 while an inlet side of the blower wheel half 95b is correspondingly parallel to the aperture 89 in the wall 73 of the structure 74. The structure 74 and the radial blower 93 are positioned in the housing 52 so that the axis of rotation 96 of the blower wheel 92 and therefore that also of the electric motor serving as a drive are inclined against the horizontal. In this way a quiet and vibration free operation of the electrical motor and the blower wheel 92 are insured even when the shaft is not supported by expensive roller bearings but instead is held by friction bearings which are designed for permanent lubrication.

The inlet side of the blower wheel half 95b communicates by means of the opening 89 and the wall 73 with the plate-shaped filter insert 70 and through this with the opening 61 in the rear wall of the housing; this in turn is connected with the flow channel 58. On the other hand, the inlet side of the blower wheel half 95 communicates by the opening 90 in the wall 78 with an exhaust opening 97 which is provided in the front wall 98 of the housing opposite the rear wall 59. Above this exhaust opening 97 there is also provided an air feed opening 99 which connects inside the housing with the heat exchanger 64, particularly with the flow through channels 66b which are defined by the individual lamellae 65b. Another plate shaped filter insert 100 is also provided between the exhaust air opening 97 in the front wall and the opening 90 in the front wall 78 of the air conducting structure 74. The two plate-shaped filter inserts 70 and 100 are preferably formed by a single mat of flexible fiber material, for example, a filter fleece, in the simplest embodiment. In this way the filter mat can be guided around the lower end of the air conducting structure 74 as shown in FIG. 1. After removing the front wall 98 of the housing the longitudinal length of the filter mat which forms the filter inserts can be pushed along the curved front edges of the inner supporting web 72 in a simple and secure manner and introduced into the chamber 63 until it reaches the end of the free space 71 and abuts the sheet metal wall 68. The longitudinal section of the filter mat which thus remains free outside of the housing 52 is then swung up at the opening side of the housing 52 in front of the air conducting structure and its upper end comes to rest in the area of the angled edge 83 When the front wall 98 is again set on the housing then the plate-like filter insert 100 is fixed length-wise between the exhaust air opening 97 and the opening 90 in the structure 74. In the vicinity of the angled edge 83 the wall 78 of the air conducting structure 74 may also carry projecting tongues or teeth 131 which penetrate into the material of the filter mass and additionally secure into position. It is apparent that the filter inserts 70 and 100 formed by one single filter mat can be very easily handled when this is necessary for cleaning or exchange.

When the radial blower 93 begins operations, the blower wheel half 95b draws in outside air through the flow channel 58 of the tubular lining 55 and guides the air along flow path 67b successively through chambers 63 and 75 as well as through the flowthrough channels 66b of the heat exchanger 64 to the air feed opening 99. From there it reaches into the room as a ventilation media current. Thus, this ventilation media current 67b precedes essentially in an ascending direction, as indicated by the dot-and-dash line in FIG. 1, from the opening 61 in the rear wall of the housing to the air inlet opening 99 in the front wall. It should be noted that the inlet side of the blower wheel half 95 is only partly registered, approximately in its upper half, with the opening 61 on the rear wall of the housing but the opening 89 in the wall 73 of the structure 74 is in alignment with its total cross-section (through the intermediate area of the filter insert 70) with the chamber 63 which is upstream from the opening 61. Thus in the particular embodiment of the device shown in FIG. 1 the ventilation media current 67b has a flow path which contains two flow deflections between the opening 61 and the supply air opening 99, which deflections are each arcs of about 90°. The first deflection leads from the opening 61 through the blower wheel half 95b into the chamber 75 of the structure 74. The second deflection, which has opposite curvature, extends from the chamber 75 into the heat exchanger 64. From the ventilation outlet side of the heat exchanger, whose bottom edge lies at the level 130, the ventilation media current proceeds essentially without further deflection to the air feed opening 99 in the front wall and from there into the room.

The exhaust media current 67a is drawn in by the blower wheel half 95a through the aperture in the wall 78 of the structure 74 via the exhaust air opening 97 in the front wall of the housing by way of the filter mat 100. The exhaust media current flow 67a arrives first in the chamber 76 of the structure 74 and is conducted from there in an ascending direction to the heat exchanger 64. It passes through the flowthrough channels 66a defined by the individual lamellae 65a of the stack whose outlet side runs by an acute angle to the wall 69 of the housing. From the wall 69 the exhaust media flow path 67 is sent, first towards the rear wall 59 of the housing, and then is deflected along this wall into the chamber 62. This chamber is, in turn, in flow connection with the opening 60 in the rear wall of the housing. Through this opening 60 the exhaust media current 67a passes into the flow channel 67 of the tubular lining 55 and is guided through the wall 53 to the outside. It is important that the flow path for the exhaust media current 67a from the front wall exhaust air opening to the outlet 60 be longer than the flow path for the ventilation media flow path 67b from its outlet 61 to the air feed opening 99. It is also important that the flow path of the exhaust media at the exit side of the heat exchanger 64 includes a flow deflection which has an arc dimension B of at least 90°. It is especially advantageous, however, when this deflection has an arc measure between 120° and 180° and preferably 150° as is indicated by the dotted line for the flow path 67a in FIG. 1. The arc measure of the flow deflection from the chamber 62 into the flow channel 67 can lie at about 90°. The heat recovery from the exhaust media flow 67a can also be improved if the cross-section of the flow path downstream of the heat exchanger 64 and also downstream from the flow deflection adjoining the exit side is made smaller (such as in the chamber 62) then the cross-section of the flow channel 67a of the heat exchanger 64. A like effect can be achieved if this cross section is smaller than the flowthrough cross section of the chamber 76 which lies upstream of the entry side of the heat exchanger 64. It has also been found beneficial if the effective opening size of the exhaust air opening 97 is dimensioned larger than the effective cross-sectional opening 60 into the flow channel 57. All of these constructional variations contribute to a maximum possible heat energy withdrawal from the exhaust media current 67a that is transferred to the ventilation media current 67b before the latter enters by the air feeding opening 99 into the room.

Figure 3:
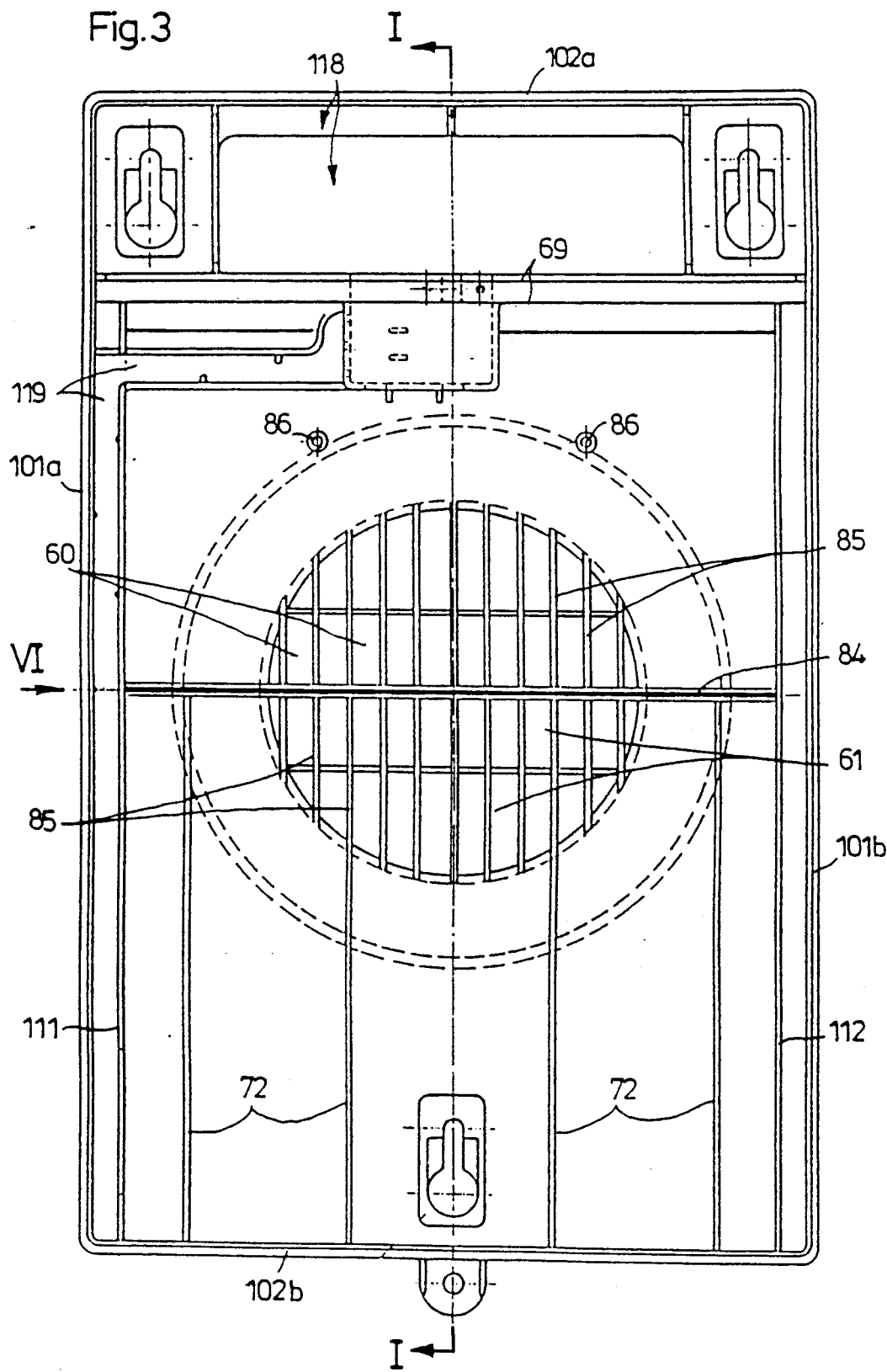
FIG. 3 shows the housing of a ventilation device like that in FIG. 1 and FIG. 2 with the front wall removed and the air feed and recovery system removed, viewed also along the direction of arrow II.

In the particular embodiment shown in FIGS. 1 and 3, the rear wall 59 and the four transverse walls 101a, 101b, 102a and 102b of the housing are fabricated as one piece formed parts for example by plastics injection molding. The front wall 98 is also preferably formed out of such a one piece formed part by injection molding. The ribs 72 and 85 as well as the transverse web 84 and the separator supports 86 are integrally molded on the pieces, thereby achieving their high stability for the housing of the device although it has a relatively slight structural weight. The support webs 72 are constructed so that they extend from the bottom transverse wall 102b toward the rear wall 59 in an arc like shape and thereby facilitate the proper insertion of the filter insert 70 into the chamber 73. For the initial portion of the filter insert 70 they act as a deflection guide into the chamber 63.

It should be noted that the heat exchanger 64 within the housing of the device is arranged both in the exhaust media current 67a and also in the ventilation media current 67b above the radial blower 93. In the flow path for the exhaust air current 67a the exit side on the level 129 of the heat exchanger forms the highest point of the flow path and at this point it joins with the first chamber 62 in a descending direction and has from there a connection to the outlet 60.

Figure 2:
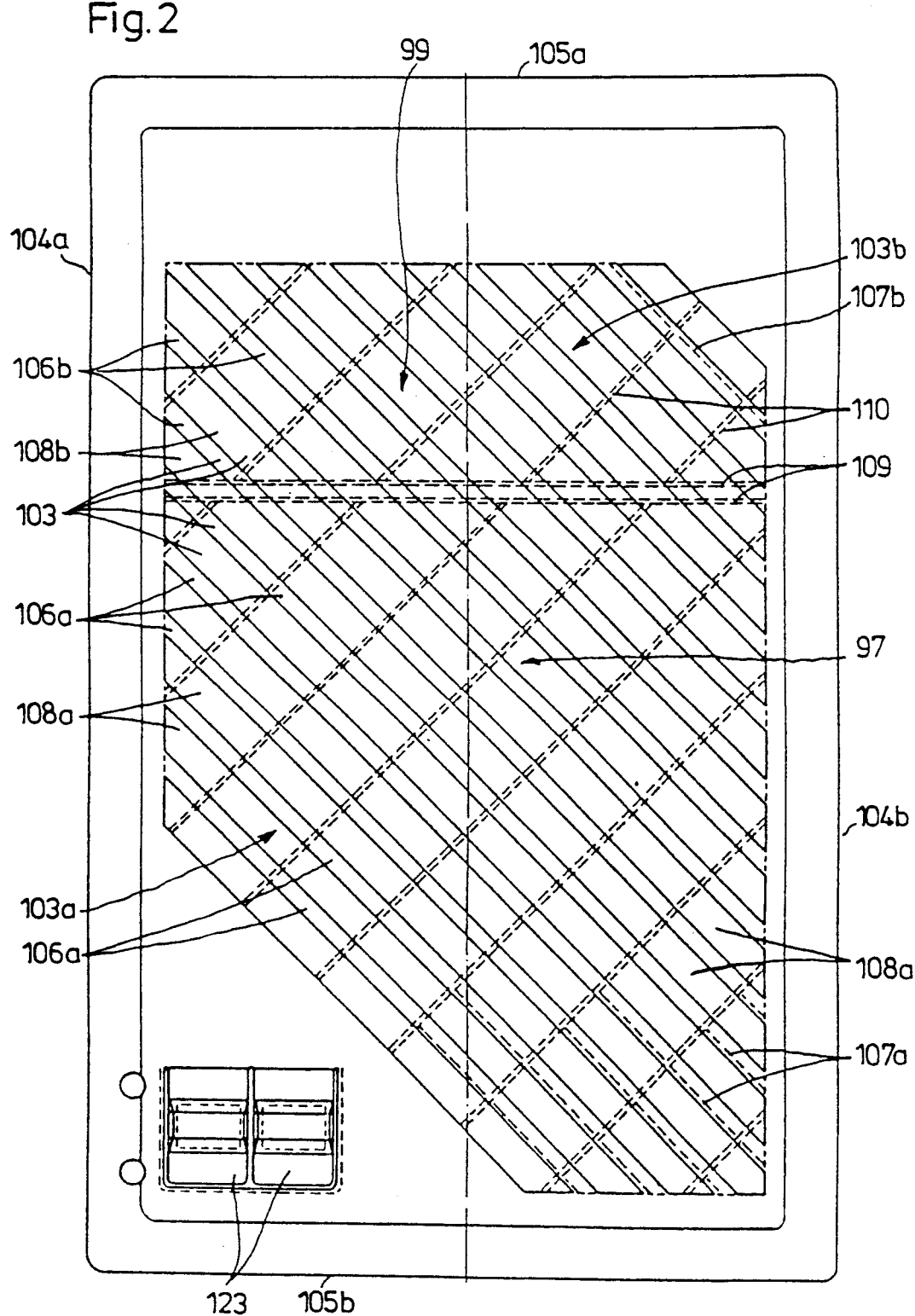
FIG. 2 is a front plan view of a ventilation device according to the invention viewed along the direction of arrow II.

It is apparent from FIGS. 1 and 2 that the front wall 98 of the housing is provided with a ribbing section 103 which runs obliquely with respect to the circumferential boundary edges 104a and 104b as well as 105a and 105b. It is apparent from FIG. 4 that the orientation of the profile of these ribs 103a in the are area of the exhaust air opening 97 is different from the orientation of the ribs 103b in the region of the supply air opening 99. Each of the ribs 103a and 103b has three different profile sections: a section lying parallel to the main plane of the front wall 106a or 106b, a section which is essentially normal to this plane 107a or 107b, and a transition section 108a or 108b which runs obliquely against this main plane. While the ribbing section 103 and its component ribs 103a and 103b are oriented as shown in FIG. 2 in such a way that the profile sections 106a and 106b which are parallel with the main plane of the front wall are co-planer with each other, the transition sections 108a which are oblique to this plane have an opposite orientation to the direction of the transition sections 108b. This can be seen best in FIG. 1. The location of the change of orientation between sections 108a and 108b is defined by an exhaust/vent separation rib 109 which sets the region of the exhaust air opening 97 apart from the region of the ventilation supply air opening 99. This exhaust/vent separation rib runs parallel to the boundary edges 105a and 105b. The actual effective opening of the ribbing area 103 and the component ribs 103a and 103b which form the openings 97 and 99 is formed by leaving out a portion of the sections 107a and 107b which are normal to the main plane of the front wall. This is indicated by the dashed lines in FIG. 2. The opening slots which are thereby formed in the individual ribs 103a in the region of the exhaust air opening 97 are thereby slanted downward and forward while the opening slots in the region of the supply air opening 99 are oriented upward and forward. The ribbing section 103 throughout the front wall, but especially in the region of the omitted profile sections 107a and 107b, is effectively stabilized by means of bracing ribs 110 which are formed on to the rear of the front wall 98. These extend essentially transverse to the course of direction of the ribbing section 103.

Considering FIG. 3 in comparison with FIG. 4 it is apparent that the air conducting structure 74 can be aligned by the aid of its two transverse walls 79 and 80 between two outer support webs 111 and 112 which are formed integrally on the inside surface of the rear wall 59 and which are parallel to the ribs 72. In contrast to these inner ribs 72 which extend only from the lower housing transverse wall 102 up to the web 84, these outer webs 111 and 112 continue upwards over the web 84 continuously up to or near the head wall 69.

Figure 5:
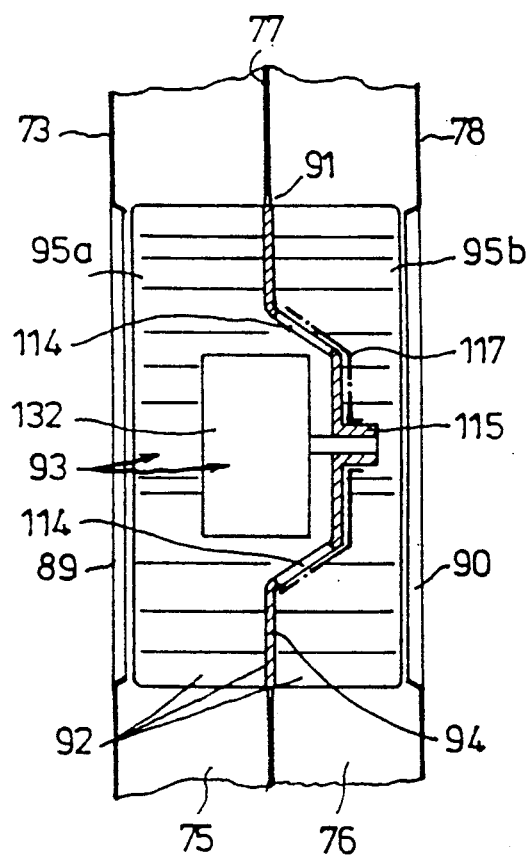
FIG. 5 is a section along the line V—V in FIG. 4.

An alternative configuration of the blower wheel 92 and the radial blower 93 is shown in FIGS. 4 and 5. This configuration is particularly recommended when the blower wheel and its two blower wheel halves 95a and 95b along with the radial separating wall 94 and the blades 113 are formed as one molded piece and of a poorly heat-conducting material such as some plastics. In this case the radial separating wall 94 is provided with recesses 114 uniformly distributed circumferentially in the region between the blades and the hub 115. These recesses are defined against each other by means of radial spokes 116. In this case each of the recesses 114 which are segments of rings is provided with a laminated body 117 of highly heat-conducting material, for example thin metal foil. In this way, in the region of the recesses 114, both the exhaust media current 67a and the ventilation media current 67b are mutually contacted. This facilitates additional heat flow between the current 67a and the current 67b. Each such laminated body 117 is preferably clamped so that it is movable axially to a limited degree on the hub 115. In this way a spacing or gap (see FIG. 5) can be created in the radial separating wall 94 which gap acts as a bypass between the two media currents and through which an exchange of air humidity may take place. The efficiency of the heat recovery can thus be further improved.

As shown in FIG. 5 the electric motor 132 of the radial blower 93 should be installed in the ventilation media current so that excess heat due to energy losses in the motor can be extracted by the ventilation media current.

Above the head wall 69 in the housing a hollow space 118 may be provided which is at least partly opened towards the rear wall 59 but which may be closed in at the front wall as shown in FIG. 1. This hollow space 118 is suited to take up a large section of a main cable which is optionally connected there with a main terminal for the ventilation device 51. Connecting lines may also be led from this hollow space to the lower end of the housing 52 by means of a channel system 119 as shown in FIG. 3 which runs inside the rear wall 59 along the head wall 69 and also between the transverse walls 101b and the outer web 112 to the lower end of the housing. There, a hollow chamber 120 may be located directly under the air conducting structure 74 which also may be supplied with electric and/or electronic control and switching elements 121 and 122. In the simplest embodiment the hollow chamber 120 can be inserted directly between the transverse walls 79 and 80 of the air conducting structure 74. In particular, the switching element 122 can be an on/off switch through which the electric connection can be made or interrupted. This on/off switch 122 is located behind an elastically deformable (for example a tongue-like shaped profile) section 123 of the front wall 98 by which the switch can be actuated in a simple manner. The pushbutton of such an on/off switch 122 can be operated right through a portion of the filter mat 100 by means of the deformable section 123. The hollow chamber 120 may also be provided with an electronic control device for the radial blower 93 which can be operated by means of a thermal-lag switch and/or a hygro-switch to permit automatic on-and-off switching of the blower 93. The thermostatic cutout can be actuated by means of a thermometer spring and the hygro-switch by means of a hygrometer spring. Both the thermometer spring and the hygrometer spring may be provided with a spiral shape whose inner end is fixed at a holder axle and whose outer end, under the influence of temperature and air humidity, moves through an adjustable switch path and thereby automatically influences the associated contacts. If the switching force of the spiral is sufficiently large it can be employed directly for actuation of a microswitch which establishes the energy supply for the drive motor of the radial blower or interrupts it. The thermometer spring and/or hygrometer spring can, however, also work together with electronic relays as control devices for the radial blower 93. For example, they may carry a permanent magnet which is associated with a switch contact for the relays, that is a "reed contact". In the preferred mode of operation of such an automatic control device for the radial blower 93, the hygrometer spring which serves as a switching element is under the influence of the exhaust media current 67a (that is, by air from the chamber 76 of the body 74) while the thermometer spring is influenced by the ventilation media current 67b which corresponds with air from the chamber 75 of the structure 74.

As shown in FIG. 1 the ventilation device front wall 98 engages in a self-centering manner by means of an integrally formed circumferential flange 124 with the border edges of the transverse walls 101a, 101b, 102a and 102b. At the same time a collar 125 embraces the outer surfaces of these transverse walls 101a, 101b 102a. 102b as also shown in FIG. 1. This front wall is fixed relative to the transverse walls of the housing by means of notched out tongues 126 as shown in FIG. 1 each of which engages by means of a protrusion 127 into matching holes 128 which are located, as shown in FIG. 6, at least on the upright transverse walls 101a and 101b.

ALTERNATE EMBODIMENT

FIG. 7 shows an alternate construction for a ventilation device capable of heat recovery. This embodiment does not have quite the heat recovery capability of the constructions according to FIGS. 1 through 6 but in many fields of application this embodiment shown in FIG. 7 is readily usable. FIG. 7 shows a ventilation device 1 for the simultaneous ventilation and exhausting of rooms and which is enclosed in, for example, a boxed-shaped housing 2. This device is also adapted to be mounted on a housing wall 3 inside a room which wall has a communication 4 to the outside into which can be inserted a tubular lining 5. The tubular lining also has a separating wall 6 which defines within the lining two flow channels 7 and 8 of approximately identical cross-section with respect to one another. Two openings 10 and 11 are provided within the rear wall of the housing whose cross sectional shapes correspond to the flow channels 7 and 8 and which are joined up with these flow channels. Opening 10 enters the housing 2 in a chamber 12 while opening 11 likewise enters the housing 2 in a chamber 13. Within the housing a heat exchanger 14 is provided which acts to recoup heat and which has for example a cross current type of construction. The heat exchanger consists of at least one lamellae-or plate-stack which is composed of the larger number of individual lamellae or plates 15a and 15b each of which may have an approximate C-shaped cross section and approximately square contour. Individual lamellae of the heat exchanger are fabricated out of relatively thin material which is highly heat conducting (for example aluminum and copper foil) and are directly superposed upon one another in order to form the stack of lamellae. The individual lamellae 15a and 15b are alternately rotated about an axis normal to their planes so that they are offset to one another by 90° and so that among them they enclose flowthrough channels 16a and 16b which are in a position 90° offset from one another and so that air currents 17a and 17b conducted through them cross each other in the flow channels, successively following each other in a layered manner. Chamber 12 is separated within the housing from the chamber 13 by means of a relatively thin sheet metal wall 18 which extends upwards by multiple bends from a plane which corresponds with the separation wall 6 of the lining 5 within the housing, up to a vertex edge of the heat exchanger 14. The top of the chamber 12 is defined by means of an end plate 19 in the housing which joins up likewise at a vertex edge of the heat exchanger and thereby produces a connection of the chamber 12 with the flow through channels 16a of the heat exchanger. A plate-like filter insert 20 connects up with the chamber 13 and is held aligned between two groups of rod shaped filter supports 21a and 21b which can if necessary be removed or installed through a wall opening 22 of the housing. Beyond the filter 20 is a chamber 23 in the housing which is defined against a chamber 25 by means of a wall 24 formed by a thin laminated body (for example sheet metal.) This laminated body wall 24 is provided with a circular recess 26 which is axially penetrated by a blower wheel 27 of an electrically driven radial blower 28. This blower wheel 27 is provided with a radial separating wall 29 which lies approximately in the same plane with the wall 24 of the laminated body and which divides the blower wheel 27 into two approximately equal halves 30a and 30b. The half 30a rotates thus within the chamber 23 while the other half 30b rotates in the chamber 25. The blower wheel 27 of the radial blower is aligned with an air intake opening 31 having holes or slots arranged in the room side front wall 32 of the housing. This half 30b of the blower wheel draws in exhaust air from the room interior into the chamber 25 which is in turn in permanent connection with flow channels 16a of the heat exchanger. The heat energy contained in the exhaust air (that is, the exhaust media current 17a) is thus taken up for the most part by the heat exchanger 14 before the waste air flows through the chamber 12, the passage 10, and the flow channel 7 and is exhausted to the outside.

Outside air is drawn through the flow channel 8 of the lining 5 through the chamber 13 and through the filter 20 by the blower half 30a of the blower wheel and is led into chamber 23 as the ventilation media current 17b It is transported from there into the flow through channels 16b of the heat exchanger. At this point the transmission heat taken up by the heat exchanger from the media current 17a is passed into the media current 17b before this ventilation current is then conducted through the chamber 33 and out the exit opening 34 in the front wall of the housing as ventilation air into the room. The exit opening 34 in the front wall of the housing can similarly be equipped with a air passage opening which has a grid of holes or slots.

In order to provide the ventilation device 1 with sound damping effect it is preferable to line the inner surfaces of the housing with sound-absorbant material 35, for example foam plastic, and also to mount a damping layer 36 between the rear wall 9 of the housing and the housing wall 3.

It has been found to be particularly desirable for automatic operation control of a ventilation device of FIG. 7 to provide an electric relay system with two connected switch contacts 43 and 46 in series, of which the switch contact 43 is equipped with a thermometer spring and the switch contact 46 is equipped with a hygrometer spring. In this arrangement, the switch contact 43 of the chamber 23 and the switch contact 46 of the chamber 25 of the device are arranged according to FIG. 7 in a schematic form in which the radial blower of the ventilation device goes into operation if and as long as there exists a predetermined reading of temperature parameters at the thermometer spring of the contact 43 and also of air humidity parameters at the hygrometer spring of the switch 46. Although the thermometer spring of the contact 43 may be so adjusted that the switch closes given an outside air temperature with an upper limit of about 15° centigrade. The hygrometer spring of the switch contact 46 may be set so that this goes into closing position only when a relative room air humidity of 50% is exceeded. The radial blower then goes on only when both parameters having appropriate values.

In the embodiment of FIG. 1 the level 129 of the exit side of the heat exchanger 64 for the exhaust media current 67a lies geometrically higher than the level 130 of the exit side in the exchanger for the ventilation media current 67b. This relationship is reversed in the embodiment of FIG. 7. There, the level of the exit side of the heat exchanger 14 for the ventilation media current 17b lies above the level 49 of the exit side of the heat exchanger 14 for the exhaust media current 17a.

Clearly, minor changes may be made in the form and construction of this device without departing from the material spirit of the invention. Therefore, it is not desired to confine the invention to the exact forms shown herein and described but it is desired to include all subject matter that properly comes within the scope claimed.

The invention having been thus described what is claimed as new and desired to secure by Letter Patent is:

1. Ventilation device for the simultaneous ventilating and exhausting of rooms, and for the recovery of heat from the ventilation media current, with a box-shaped housing which can be installed on the inside of the room at or in a housing wall, and which can be connected to one channel leading to the outside air for each of the media currents for ventilating and exhausting, wherein within the housing there are provided two flow routes separated from one another, an outlet as well as a heat exchanger for the media currents for ventilating and for exhausting, wherein the inlet openings of both routes are arranged in the opposite walls, in the front wall and in the rear wall of the housing respectively, wherein for positive media transport in both flow routes there is provided within the housing a radial blower with a blower wheel divided, by means of a radial dividing wall, into two halves which transmit independently of one another and which blower wheel projects with one half into each flow routes at a site which is at least partially adjacent to the respective inlets, and wherein the inlet forms the exhaust opening in a wall facing the room side, while the opening for the ingoing air for the ventilation media current is spaced from the exhaust opening and is likewise provided in a wall facing the room side, characterized by the fact that, the flow route for the exhaust media current (67a) is longer than the flow route for the ventilation media current (67b) and that the cross-sectional area of flow of the flow route for the exhaust media current (67a) downstream of the heat exchanger (64) and of a deflection in the flow is dimensioned in a downstream chamber (62) smaller than the cross-section area of flowthrough channels (66a) of the heat exchanger (64) and the chamber (76) situated before its inlet side, and wherein the channel defining the flow route for the exhaust media current (67a) from the exit side of the heat exchanger (64) defects at least 90° between the head wall (69) and the downstream chamber (62).

2. Ventilation device as recited in claim 1 wherein the deflection in the channel for the exhaust media current is between about 120° and 180°, preferably about 150°.

3. Ventilation device as recited in claim 1, wherein the area of flow of the room exhaust opening in front wall (97) for the exhaust media current (67a) is dimensioned larger than the area of flow of the exit opening (60) for said current 4. Ventilation device as recited in claim 1 wherein the two flow routes (67a and 67b) are conducted from the inlets (room exhaust opening (97) and ventilation opening (61)) onwards at least, up to the heat exchanger (64) through the housing (52) in an ascending direction, that the heat exchanger (64) is arranged in both flow routes above the radial blower (93), and that at least in the flow route for the exhaust medium current (67a) the heat exchanger (67a) forms the geometrically highest point (129) of the route.

5. Ventilation device as recited in claim 1, wherein the flow route for the ventilation media current (67b) from the exit side of the heat exchanger (64) to the opening for the air feed opening (99) has a deflection arc of less than 90°, preferably between 0° and 60°.

6. Ventilation device as recited in claim 1 wherein the planes of the ventilation intake (61) and exhaust opening (97) of the housing (2 or 52) lie parallel to the plane of the inlet sides of the blower-wheel halves (95a and 95b) or proceed inclined at an acute angle thereto whereby at least the chambers (75 and 76) of the flow routes containing the blower-wheel halves (95a and 95b) extend in each case parallel to the plane of rotation of the blower-wheel halves (95a and 95b).

7. Ventilation device as recited in claim 6 wherein the inlet side of the blower-wheel half (30b or 95a) associated with the exhaust media current (17a or 67a) is substantially totally in covering position with the associated room exhaust opening (97) of the housing (52) while the inlet side of the blower-wheel half (95b) associated with the exhaust media current (67b) is only partly covered by the associated inlet opening (61) of the housing (52).

8. Ventilation device as recited in claim 1 wherein the inlet opening (11 or 61) for the ventilation media current (67b) and the outlet opening (60) for the exhaust media current (67a) are directly superposed in the rear wall (59) of the housing (52) and are separated from one another merely by a web (84) whereby each one of these openings (10 or 60 and 11 or 1) is defined against a crossbar (84) as a semicircular surface and is connectable to a correspondingly, longitudinally divided channel tube (55).

9. Ventilation device as recited in claim 1 wherein at least between the intake opening (61) of the ventilation media current (17b or 67b) and the inlet side of the associated blower-wheel half (30a or 95a) a filter (20 or 70) is provided.

10. Ventilation device as recited in claim 9 wherein between the room exhaust opening (97) for the exhaust air current (67a) and the inlet side of the associated blower-wheel half (95a) a filter (100) is provided.

11. Ventilation device as recited in claim 10 wherein both filters (70 and 100) are formed as a one-piece filter mat which is inserted between three housing walls-the rear wall (59), the transverse bottom wall (102b) and the front wall (98) extending at angles to one another-the mat being laid around the blower-wheel (92) with its two halves (95a and 95b) enclosing the chambers (75 and 76) of the air-conducting structure (74).

12. Ventilation device as recited in claim 11 wherein a free space (71) for the filter mat (70 and 100) is provided from the front wall (98) along a transverse wall (102b) to the rear wall (59) of the housing (52) wherein at least from the transverse wall (102b) to the rear wall (59) arc-like running guide elements in the form of inner support ribs (72) are provided.

13. Ventilation device as recited in claim 12 wherein the installation position of the filter (70 and 100) can be fixed through clamping surfaces or engagement prongs (131) which are developed at least between the front wall (98) of the housing (52) and the adjacent boundary walls (78) of the air conducting structure (74) which encloses the chambers (75 and 76).

14. Ventilation device as recited in claim 1 wherein the rear wall (59) of the housing (52) carries the air-conducting structure (74) which defines the chambers (75 and 76), the radial blower (93) and the heat exchanger (64) and wherein a detachably connectable covering cap is formed by the transverse walls and the front wall.

15. Ventilation device as recited in claim 1 wherein the rear wall (59) and the transverse walls (101a, 101b, 102a and 102b) of the housing (52) form a one-piece shaped part which can be closed by means of a detachable front wall (98), and which takes up the air-conducting structure (74) which forms the chambers (75 and 76), the radial blower (93) and the heat exchanger (64).

16. Ventilation device as recited in claim 1 wherein the heat exchanger (14 or 16) has a cross current construction and is formed from a stack of individual plates or lamellae formed of thin, heat-conducting laminated material, and wherein the walls (73, 77, 78, 79, 80) of the air-conducting structure (74) which define the chambers (75 and 76) are formed of a heat-conducting, laminated material.

17. Ventilation device as recited in claim 16 wherein two diagonally opposite corners of the plate- or lamellae-stack of heat exchanger are clamped between two angular edges (82 and 83) of the air conducting structure (74) which defines the two chambers (75 and 76), while two other diagonally opposite corners of the stack abut on supporting and alignment stops of the air conducting structure (74) or the housing (52).

18. Ventilation device as recited in claim 1 wherein the air-conducting structure (74) which defines the two chambers (75 and 76) is provided at the end that faces away from the heat exchanger (64) with a hollow chamber (120) adapted to accommodate electric/electronic switches and control links (121 and 122), and wherein an electric main switch (122) is provided in the hollow chamber (120) which operates directly by a pushbutton.

19. Ventilation device as recited in claim 1 wherein the radial blower is automatically switchable on and off by means of an electric relay control device, whose switching link consists of a thermometer spring and/or hygrometer spring, and wherein the thermometer spring (43) and/or hygrometer spring, (46) carries a permanent magnet to which a reed contact is assigned as switch contact for the relay control device.

20. Ventilation device as recited in claim 1 wherein the front wall is provided with an exhaust air intake; while the ventilation air outlet for the ventilation media current is provided at a distance from this exhaust air intake in the front wall, wherein the front wall (98) has a ribbing (103) which proceeds diagonally to its boundary edges (104a, 104b, 105a and 105b) and wherein the ribbing (103) is perforated in each case at least in the region of the exhaust air intake (97) and the ventilation air outlet (99).

21. Ventilation devices recited in claim 20 wherein each rib (103a and 103b) of the ribbing has a profile section (106a and 106b) lying parallel to the main plane of the front wall (98), a profile section (107a and 107b)

running essentially normally to the main plane, and a transition-section (108a and 108b) which is deposed obliquely against the main plane, and wherein the perforations of the ribbing (103) are located in the profile sections (107a and 107b) which run essentially normally to the main plane of the front wall (98).

22. Ventilation device as recited in claim 21 wherein the inclination direction of the transition profile sections (108a) provided in the region of the exhaust air intake (97) mirror inverted with respect to the inclination direction of the transition profile sections (108b) in the region of the supply air outlet (99), and wherein the transition-profile sections (108a) in the region of the exhaust air intake (97) have a diagonally downward and forward directed position, while in the region of the supply air outlet the transverse profile section (108b) are directed diagonally upward and forward.

23. Ventilation as recited in claim 22 wherein at the rear side of the front wall (98) stiffening webs (110) are formed at least in the region of the exhaust air intake (97) and supply air outlet (99) which webs extend essentially transverse to the course of direction of the ribbing (103) and wherein the ribs (103a and 103b) are interconnected with one another in the region of the perforations.

24. Ventilation device as recited in claim 1 wherein the radial blower (93) has an axis of rotation (96) arranged in an inclined direction with respect to the horizontal line of the air conducting structure (74) containing the chambers (75 and 76) and in the housing (52).

25. Ventilation device as recited in claim 1, in which the radial blower and blower wheel is fabricated of poorly heat-conducting material, wherein a radial separation wall (94) between the two blower wheel halves (95a and 95b) is provided with perforations (114) in the region between a bearing hub (115) and blades (113) which perforations are covered at least for the greater part by a thin laminated body (117) of highly heat-conducting material.

26. Ventilation device as recited in claim 25 wherein the laminated body (117) is axially shiftable on the hub area (115) relative to the perforations (114) in order to open and close passage gaps between the two blower-wheel halves (95a and 95b).

27. Ventilation device as recited in claim 1 wherein a chamber (118) is formed in the housing (52) above the heat exchanger (64) which takes up the electric main connection for the ventilation equipment (51) and in which an electric main cable of extended length can be accommodated.

28. Ventilation device for simultaneous ventilating and exhausting rooms and for heat recovery from the exhaust media flow with a box-shaped housing, which is arranged on the inside of the room or in a structural wall and which can be connected to a channel for the ventilation and exhaust media flow leading to the outside air, wherein two flow paths, separate from one another, are formed within the housing, each path of which has an intake opening and an outlet opening as well as a heat exchanger for ventilation and exhaust media flow between these paths, wherein, furthermore, the intake openings of both flow paths are arranged in walls that are opposite each other, in the front wall and in the back wall, of the housing, wherein, further, for purposes of guided media conveyance in both flow paths within the housing, a radial blower is provided with a blower wheel divided into two halves defined independently from one another by a radial separating wall, which blower extends into both flow paths with each of its halves at a place which is at least partially adjacent to the intake openings, and wherein, the intake opening forms the exhaust opening in one wall turned to the room side, while the air outlet opening for the ventilating media flow is provided at a distance from this exhaust opening, also in a wall turned toward the room side characterized by the fact that a chamber (13) is associated with a flow channel (8) for the ventilation media flow (17b) in housing (2) and a chamber (12) is associated with the flow channel (7) for the exhaust media flow (17a) in housing (2), whereby chambers (12 and 13) are separated from one another by a thin sheet-metal wall, which is vertically placed in the housing (2) by means of a separating wall (6) extending from flow channels (7 and 8) in a tubular lining (5) up to one vertex edge of the heat exchanger (14); that chamber (12) is bound at the top by a head wall (19), which connects to another vertex edge of heat exchanger (14); that chamber (12) has connection with first flow-through channels (16a) of heat exchanger (14) by means of the wall (18) and the head wall (19) to which a chamber (25) is also connected, which chamber contains the exhaust opening (31) to the room; that chamber (25) is separated by a sheet-metal wall (24) from another chamber (23), which through a filter (20) corresponds to chamber (13) adjacent to flow channel (8); that the heat exchanger (14) is connected to chamber (23) by second flow-through channels (16b), which are connected to the room-side air outlet opening (34) in front wall (32) by another chamber (33); and that the blower wheel (27) of radial blower (28) passes through an aperture (26) in the sheet-metal wall (24) and is aligned with the exhaust opening (31) of front wall (32), wherein it is taken up, along with its blower wheel half (30a), in chamber (23) adjacent to filter (20), while the other blower wheel half (30b) lies in the chamber (25) provided with exhaust opening (31), wherein the flow channels (7 and 8) in tubular lining (5) of a wall aperture (4) are separated from one another by separating wall (6) the channels having identical cross section, and wherein the outlet opening (19) of chamber (12) and the inlet opening (10) of chamber (13) in rear wall (9) of housing (2) can be connected to said flow channels (7 and 8).

29. Ventilation device as recited in claim 28 wherein the heat exchanger (14) is a heat-recovering heat exchanger of crosscurrent structure comprising a large number of individual lamellae or plates (15a and 15b).

30. Ventilation device as recited in claim 28 wherein the filter 20 comprises a plate-shaped filter insert aligned between two groups of rod-shaped holder elements (21a and 21b), wherein the filter insert (20) can be installed and dismantled through a wall opening (22) of the housing (2).

* * * * *